Figure 1:
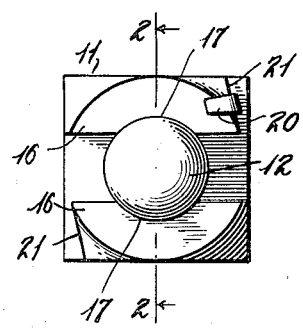

April 8, 1924. 1,490,072

C. H. PAYNE

NUT LOCK

Filed March 30, 1923

Inventor
C. H. Payne

By
Attorney

Patented Apr. 8, 1924.

1,490,072

UNITED STATES PATENT OFFICE.

CHARLES H. PAYNE, OF DONIPHAN, MISSOURI.

NUT LOCK.

Application filed March 30, 1923. Serial No. 628,892.

*To all whom it may concern:*

Be it known that I, CHARLES H. PAYNE, a citizen of the United States, residing at Doniphan, in the county of Ripley and State of Missouri, have invented certain new and useful Improvements in Nut Locks, of which the following is a specification.

This invention is directed to improvements in nut and bolt locks and provides efficient means for locking the bolt and nut together to prevent accidental separation thereof.

A further object of the invention is to provide a nut slotted to receive a taper locking key which automatically binds against the thread of the bolt during any reverse turning or "backing up" of the nut on the bolt.

Various other objects and advantages of the invention will become apparent from the following description.

Figure 3:
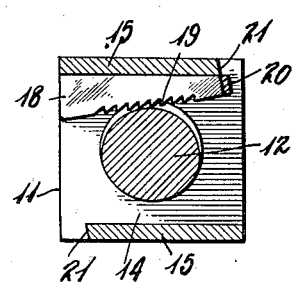
Figure 2:
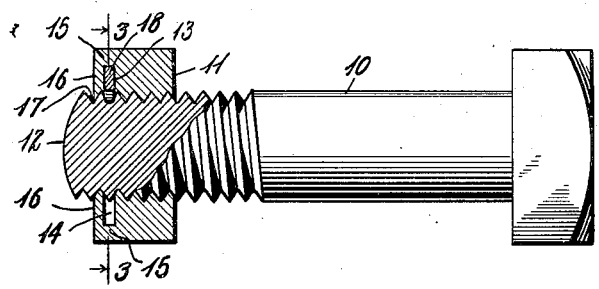
Figure 4:
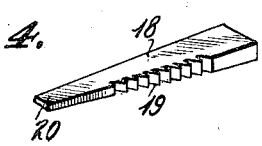

In the drawing:

Figure 1 is a top plan of the nut and bolt illustrating the application of the invention, Figure 2 is a side elevation thereof with the parts partly shown in section to illustrate the construction, Figure 3 is a sectional view of the nut lock as taken along line 3—3 of Figure 2, and Figure 4 is a perspective view of the locking key.

Describing the invention in detail, 10 indicates a bolt of conventional type having a nut 11 screwed on to the threaded shank 12 thereof. In carrying out the invention, the nut 11 is provided in its outer face with slots 13 and 14 extending along opposite sides of the opening in the nut and opening upon shank 12 of the bolt 10. These slots may be provided by constructing the bolt with side extensions 15 supporting inwardly directed flanges 16 overlapping the nut in spaced relation to the outer face thereof and being suitably grooved, as at 17, to accommodate the shank of the bolt.

Insertable in either of the slots 13 and 14 is a taper locking key 18, as illustrated in Figure 4, which key is provided along one side with a plurality of teeth 19, preferably arranged in a group located intermediate the opposite ends of the key as shown.

When it is desired to lock the nut in any position on the bolt, the key is inserted with its small end first thru one of the slots until it becomes wedged between the threads of the bolt and the adjacent wall 15 of the nut. Hence, it is obvious that when the key is forced into place it will tend to securely lock the nut and bolt together, whereby accidental separation of the same is prevented. It will be noted the teeth of the locking key slope rearwardly from the small end thereof and the taper of the key is such that should the nut start a backward movement on the bolt, it will tend to draw the key tighter by reason of the teeth biting into the threads of the bolt. The point 20 of the key is made soft so as that it will bend easily over the end of flange 16, the said end of the flange being cut away inwardly of the adjacent edge of the nut and at a taper as shown at 21 in the drawings. The key is thus securely held in place and prevented from working loose from the slot.

From the foregoing it is thought that the advantages and novel features of the invention can be readily understood and that further detailed description thereof is not required.

What is claimed is:

In a nut lock, the combination with a bolt having a threaded shank, of a nut having a threaded opening to receive the shank of said bolt, said nut being provided with slots on opposite sides of and open to the threaded opening thereof, said slots being spaced below the upper face of said nut to provide overhanging flanges, said flanges having opposite ends cut away in spaced relation to the adjacent sides of the nut to provide slanting locking shoulders, a locking key insertable in either of said slots being of tapered formation whereby it may be wedged between the threaded shank of said bolt and the outer wall of the slot said key having teeth engageable with the threads of said bolt, a point foldable back over the locking shoulder of the respective flange to hold the key in place, and said key when in place being adapted to lie entirely within the planes of the sides of said nut.

In testimony whereof I affix my signature.

CHARLES H. PAYNE.